United States Patent [19]
Jones

[11] Patent Number: 5,993,991
[45] Date of Patent: *Nov. 30, 1999

[54] BATTERY VENT PLUG IMPROVEMENT

[76] Inventor: William E. M. Jones, 605 Glenview Dr, Horsham, Pa. 19044

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,910

[22] Filed: Jan. 29, 1997

Related U.S. Application Data

[60] Provisional application No. 60/010,759, Jan. 29, 1996.

[51] Int. Cl.$^6$ .................................................. H01M 2/12
[52] U.S. Cl. ............................... 429/89; 429/163; 429/53
[58] Field of Search .................................. 429/225, 228, 429/175, 53, 54, 163, 167, 171, 172, 82, 84, 88, 89

[56] References Cited

U.S. PATENT DOCUMENTS

| | | |
|---|---|---|
| 1,316,035 | 9/1919 | Hazelett . |
| 4,002,494 | 1/1977 | Vengrofski ................................ 429/89 |
| 5,356,734 | 10/1994 | Oureshi ..................................... 429/88 |
| 5,525,438 | 6/1996 | Kostrivas et al. ........................ 429/87 |

OTHER PUBLICATIONS

"Webster's II New Riverside University Dictionary", Riverside Publishing Company, p. 114 (No month available.), 1988.

Engineering Drawing—Yuasa–Exide Inc. having approved date of Jun. 6, 1995.

*Primary Examiner*—Maria Nuzzolillo
*Assistant Examiner*—Carol Chaney
*Attorney, Agent, or Firm*—Synnestvedt & Lechner LLP

[57] ABSTRACT

A vent plug for insertion into a battery vent well that retains the original large diameter of the well. The vent plug has a body having a top and a bottom and an opening extending from the top to the bottom. A neck extends from the body for insertion into the well. The neck has an opening therein and an arm positioned to engage the underside of a projection in the well without substantially intruding into the well diameter.

15 Claims, 3 Drawing Sheets

BATTERY VENT PLUG IMPROVEMENT

This application claims the benefit to U.S. Provisional Application No. 60/010,759, filed Jan. 29, 1996.

BACKGROUND

The present invention relates to vent plugs for batteries, and more particularly to batteries having bayonet-type vent wells.

Industrial batteries produced in the United States are generally equipped with molded plastic "bayonet" vent plugs such as that shown in FIG. 1. The plug A is inserted into a vent well B in the cover C and rotated a quarter turn to make a tight seal against a rubber washer. This kind of vent plug is removed to allow water to be added to the cell and then replaced.

As illustrated in FIG. 2, a modified version of this kind of vent plug has a flip-top cover D that allows water to be added without removing the plug A. One drawback of these kinds of plugs is that the opening in the neck E of the vent is reduced (compare the original minimum diameter of the vent well opening D1 between the bayonets with the reduced diameter of the plug opening D2 in FIGS. 1 and 2).

This causes two problems: First, it is now more difficult to see the electrolyte level in the cell due to less light and a narrower angle of view. Second, automatic watering guns used to add water to the cells must have a smaller diameter nozzle to access the cells.

Accordingly, it is an object of the present invention to provide a vent plug that allows the convenience of watering the cell without removing the vent plug but which does not restrict the diameter of the opening in the vent well.

Additional objects, advantages and novel features of the invention will be set forth in part in the description that follows, and in part will become apparent to those of ordinary skill in the art upon review of the following or may be learned by practice of the invention.

SUMMARY OF THE INVENTION

The invention provides an improved vent plug for insertion into a battery well. The battery well itself has two projections spaced from one another a distance which defines the minimum well diameter, i.e., the diameter of the opening available for insertion of an item such as a water gun.

The vent plug itself has a body having a top and a bottom and an opening which extends from the top through the body. Extending from the body for insertion into the well is a neck that has an opening below the opening in the body of the vent plug. The neck also has a lower end and a neck wall, and includes an arm positioned to engage the underside of one of the projections when the plug is rotated in the well. The vent plug preferably includes a flip-top lid to allow easy access to the well for watering.

DETAILED DESCRIPTION

Figure 3A:
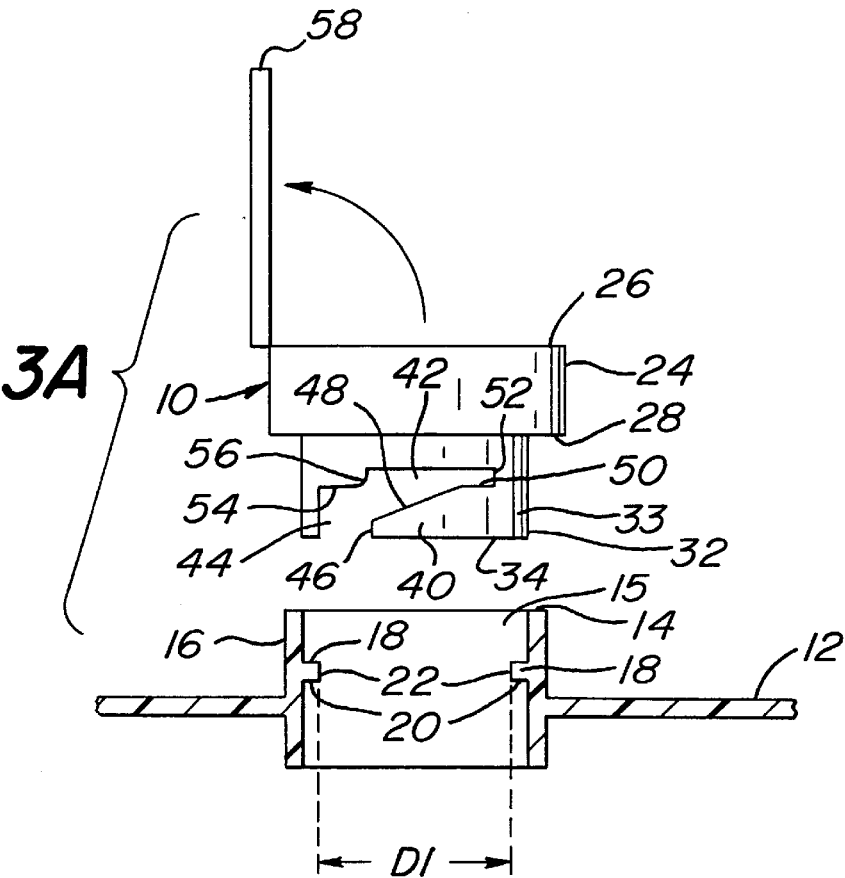
FIG. 3A shows an improved vent plug in accordance with the present invention above a vent well shown in cross section.
Figure 3B:
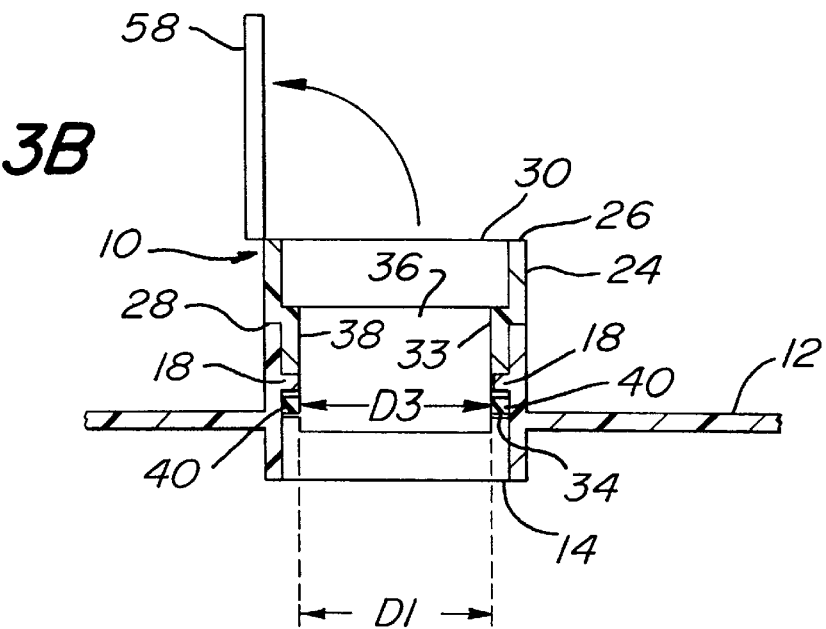
FIG. 3B shows a cross sectional view of the improved vent plug of FIG. 3A inserted into the vent well.
Figure 4:
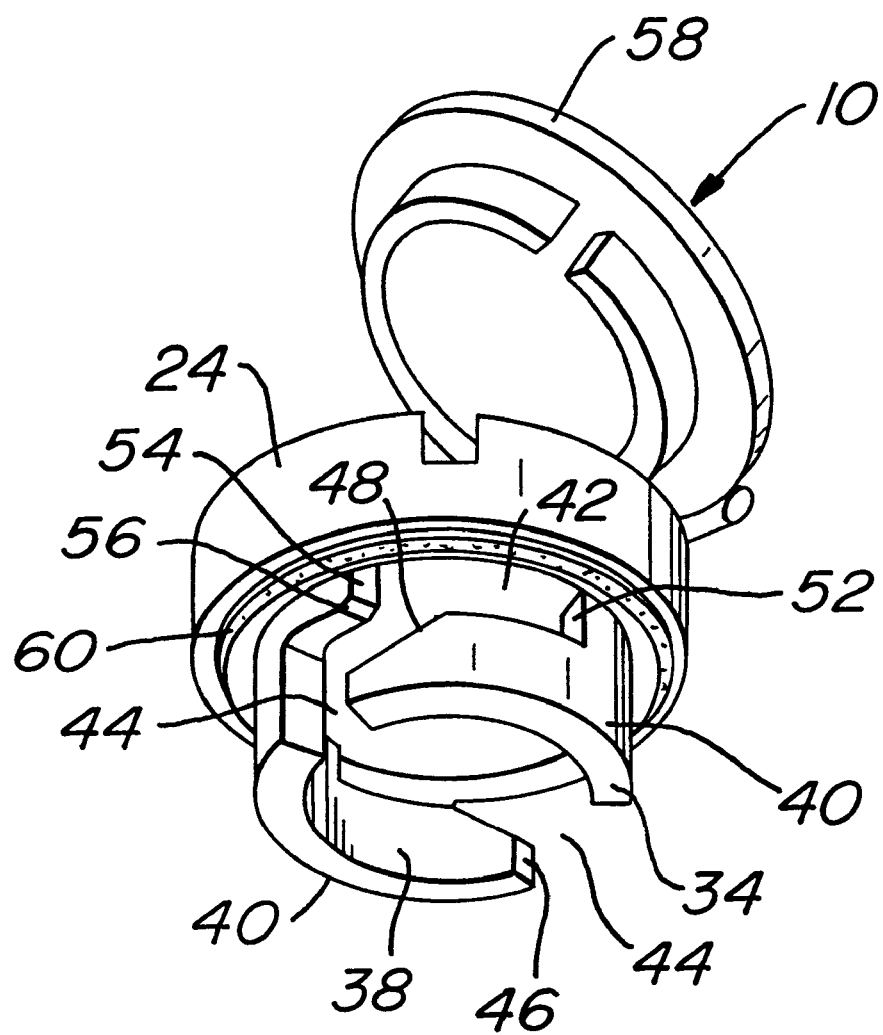
FIG. 4 shows a perspective view of an improved vent plug.

The invention as illustrated with reference to FIGS. 3A, 3B, and 4 is an improved design of a flip-top vent plug 10 that allows the convenience of a flip-top opening but retains essentially the original large diameter opening of the vent well in the cover of a battery.

With particular reference to FIG. 3A, the cover of the battery cell 12 has a vent well 14 providing an opening 15 into the cell 12 as shown. The vent well 14 has a well neck wall 16 and two projections 18 extending from the wall 16 which are spaced from one another on opposite sides of the well 14. Each of the projections 18 has an underside 20 and a side edge 22. It is seen that the distance between the side edges 22 of the projections 18 defines a minimum well diameter D1. This is the maximum diameter available for an item such as a water gun to be inserted into the vent opening 15.

With particular reference to FIGS. 3A and 3B, the vent plug 10 has a body 24 having a top 26 and a bottom 28. Extending from the top 26 through the body 24 to the bottom 28 is an opening 30 which provides access to the inside of the cell. A flip-top cover 58 on the top 26 of the body 24 covers the opening 30 and is easily opened for adding water to the battery.

The vent plug 10 has a neck 32 extending from the body 24 for insertion into the well 14. The neck 32 has a neck wall 33 and a lower end 34. An inner surface 38 of the neck wall 33 defines an opening 36 in the neck 32 below the opening 30 in the body 24 (see FIG. 3B). As shown, the opening 36 has a diameter D3 (the inner diameter of the neck 32) which is large enough such that the vent plug 10 does not substantially intrude into the opening D1.

The neck 32 has two arms 40 that mate with the projections 18 from the underside 20, each arm being positioned to engage the underside 20 of one of the projections 18 when the plug is inserted and rotated in the well 14. Each of the arms 40 is configured to form a slot 42 through the neck wall 33 of suitable size to receive one of the projections 18 upon insertion and rotation of the plug 10 in the well as illustrated in FIG. 3B. Each of the slots 42 has an open end 44 along the lower end 34 of the neck 32 between the two arms 40 for receiving the projections 18 when the plug 10 is initially inserted into the well.

As shown, the neck, including the arms 40, does not substantially intrude into the minimum well diameter D1. Put another way, the diameter D3 of the opening 36 is not substantially smaller than the minimum well diameter D1 such that a cylindrical item such as the nozzle of a watering gun having a diameter substantially the same as D1 and which fits in the vent well 14 without the vent plug 10 would also fit with the vent plug 10 in place.

The arms 40 have a distal end 46 bounding one side of the open end 44. Each arm 40 also has an angled surface 48 defining an edge of the slot 42 for engaging the underside 20 of the projection 18 upon insertion and rotation of the vent plug 10 to tighten the plug against the cell to form a tight seal. The angled edge 48 leads to a horizontal top edge 50 on the arm 40 which forms a cup-like stop section 52 sized to receive the projection 18 as seen in FIG. 3B.

A step 54 in the profile of the neck opposite the cup-like slot section 52 forces the plug 10 to "snap" into place around the projection 18 within that slot. The vent plug will stay locked in place despite vibrations and other disturbances. A rounded edge 56 on the step 54 allows th plug to be snapped out of position by rotation for removal.

A washer 60, such as one made of rubber, provides a good seal.

Figure 1:
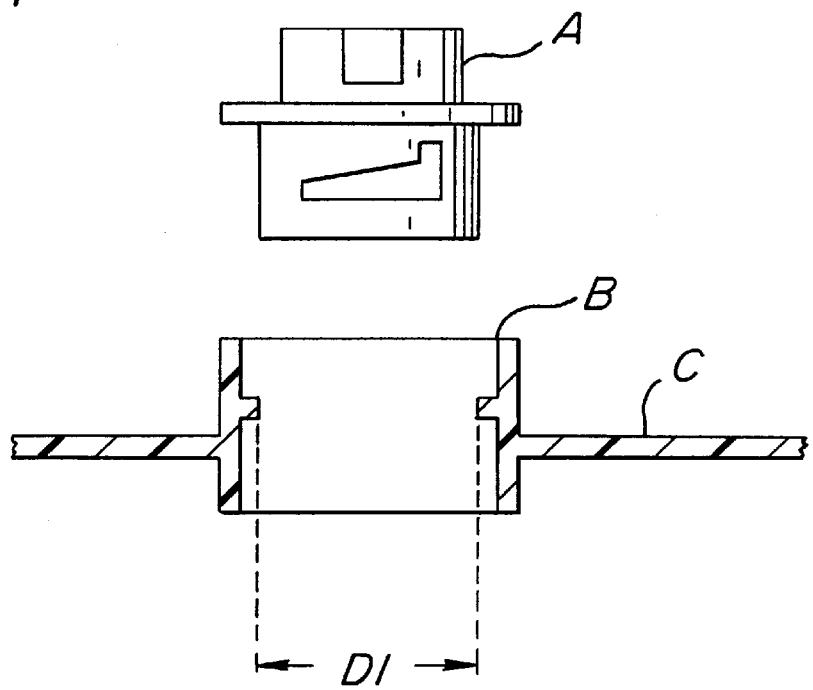
FIG. 1 shows a conventional bayonet vent plug above a cross sectional view of a vent well having bayonet projections.
Figure 2:
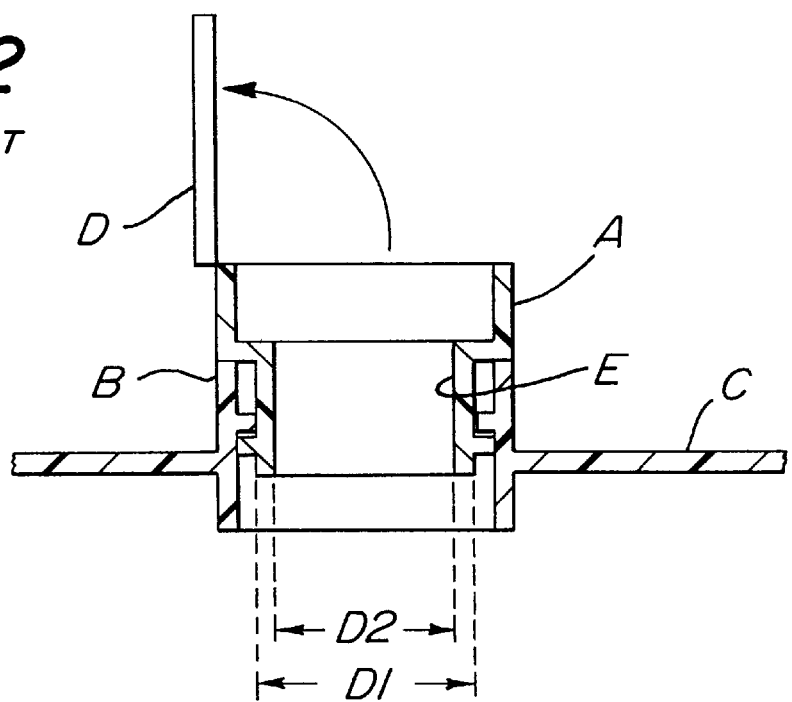
FIG. 2 shows a cross sectional view of a conventional flip-top plug inserted in a vent well and which has a reduced neck diameter compared with the original diameter.

It is seen that the present invention provides advantageous features over prior vent plugs. Watering the battery can be done with the plug left in place. A water gun requiring all of the minimum well diameter D1 to fit into the well can now fit into the vent plug of the present invention as the plug can have an opening essentially the same diameter as that of the vent well as seen in FIG. 3B. This is possible since the arms of the present invention do not extend radially from the side of the vent plug to engage the projections as does the prior art as seen in FIG. 2.

The above description is not intended to limit the invention to such disclosure, it being understood that changes and modifications may be incorporated within the scope of the appended claims.

What is claimed is:

1. A vent plug for insertion into a battery vent well, wherein said vent well includes two projections spaced from one another a distance defining a minimum well diameter, said projections further having an underside; said vent plug comprising:

a body having a top and a bottom and an opening extending from said top to said bottom; and a neck extending from said body for insertion into said well and having a lower end and a neck wall, said neck forming an opening below said opening in said body, said neck including an arm positioned to engage the underside of one of said projections when said plug is rotated in said well, said arm defining a slot through said neck wall for receiving said one of said projections upon rotation of said plug in said well, said slot being open ended at the lower end of said neck.

2. A vent plug in accordance with claim 1 wherein said neck does not substantially intrude into said minimum well diameter when said vent plug is inserted into said well.

3. A vent plug in accordance with claim 1 further comprising a flip-top cover covering the opening in the top of said body.

4. A vent plug in accordance with claim 1 wherein said arm further includes an angled surface positioned to engage the underside of said one of said projections and urge said vent plug against said battery upon rotation of said vent plug.

5. A vent plug in accordance with claim 4 wherein said angled surface defines an edge of said slot.

6. A vent plug in accordance with claim 1 wherein said neck includes a second arm for engaging a second projection of said two projections.

7. A vent plug in accordance with claim 1 further comprising a movable cover positioned over the opening in said body top.

8. A vent plug in accordance with claim 7 wherein said neck has an inner diameter which is substantially not less than said minimum well diameter.

9. A vent plug for insertion into a battery vent well, wherein said vent well includes two projections spaced from one another, the space between the two projections defining a minimum well diameter, said projections further having an underside; said vent plug comprising:

a body having a top and an opening extending from said top through said body; and a neck extending from said body for insertion into said well and having a lower end, said neck forming an opening below said opening in said body, said neck having arms positioned to engage the underside of said projections when said plug is rotated in said well, said arms not substantially intruding into said minimum well diameter when said vent plug is inserted into said well such that a cylindrical item of substantially the same diameter of said minimum well diameter which will fit into said vent well with the vent plug not inserted in the well will fit in the well when said vent plug is inserted into the well.

10. A vent plug in accordance with claim 9 further comprising a neck wall and slots through said neck wall for receiving said projections upon rotation of said plug in said well, said slots being open ended at the lower end of said neck.

11. A vent plug in accordance with claim 10 wherein said opening formed by said neck has an inner diameter which is substantially the same as said minimum well diameter.

12. A vent plug in accordance with claim 11 further comprising a movable cover positioned over the opening in said body top.

13. A vent plug for insertion into a battery well, wherein said well has two projections spaced from one another and positioned on opposite sides of said well, wherein said projections have an underside, and wherein the distance between the two projections defines a minimum well diameter; said vent plug comprising:

a body having a top and an opening extending from said top through said body;

a moveable cover positioned over the opening in said body top; and a neck extending from said body for insertion into said well and having a lower end, said neck forming an opening below the opening in said body, said neck opening having a diameter not substantially less than said minimum well diameter, said neck comprising arms positioned to engage the underside of said projections when said plug is rotated in said well, said neck further having slots for receiving said projections when said plug is rotated in said well.

14. A vent plug in accordance with claim 13 wherein each of said slots has an open end along the lower end of said neck.

15. A vent plug in accordance with claim 14 wherein said neck has a neck wall and wherein said slots extend through said neck wall.

* * * * *